(12) United States Patent
Meng et al.

(10) Patent No.: US 12,706,698 B2
(45) Date of Patent: Aug. 11, 2026

(54) ACKNOWLEDGEMENT FEEDBACK FOR POSITIONING IN RADIO RESOURCE CONTROL INACTIVE STATE

(71) Applicant: Nokia Technologies Oy, Espoo (FI)

(72) Inventors: Yan Meng, Shanghai (CN); Diomidis Michalopoulos, Munich (DE); Jianguo Liu, Shanghai (CN); Timo Koskela, Oulu (FI); Tao Tao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 18/560,127

(22) PCT Filed: Jul. 22, 2021

(86) PCT No.: PCT/CN2021/107986

§ 371 (c)(1),
(2) Date: Nov. 10, 2023

(87) PCT Pub. No.: WO2023/000279

PCT Pub. Date: Jan. 26, 2023

(65) Prior Publication Data

US 2024/0275523 A1 Aug. 15, 2024

(51) Int. Cl.
*H04L 1/1607* (2023.01)
*H04W 72/04* (2023.01)

(52) U.S. Cl.
CPC ........... *H04L 1/1678* (2013.01); *H04W 72/04* (2013.01)

(58) Field of Classification Search
CPC ... H04L 1/1678; H04L 1/0017; H04L 1/1825; H04L 1/1628; H04L 1/1685;
(Continued)

(56) References Cited

U.S. PATENT DOCUMENTS 9,467,885 B2 10/2016 Tenny et al.
2020/0221290 A1 7/2020 Wiemann et al.
(Continued)

FOREIGN PATENT DOCUMENTS

CN 109076480 A 12/2018
CN 109644341 A 4/2019
(Continued)

OTHER PUBLICATIONS

"3rd Generation Partnership Project; Technical Specification Group Radio Access Network; LTE Positioning Protocol (LPP (Release 16)", 3GPP TS 37.355, V16.4.0, Mar. 2021, pp. 1-298.
(Continued)

*Primary Examiner* — Yaotang Wang
(74) *Attorney, Agent, or Firm* — Lippes Mathias LLP

(57) ABSTRACT

Embodiments of the present disclosure relate to devices, methods, apparatuses and computer readable storage media of the acknowledgement feedback for a positioning in RRC inactive state. The method comprises receiving, at a first device in a radio resource control, RRC, inactive state, information at least indicating a latency requirement for the first device to transmit an acknowledgement feedback for a reception of a message, the message being associated with a positioning of the first device and transmitted from a second device or a fourth device to the first device; and performing the transmission of the acknowledgement feedback for the reception of the message at least based on the information without changing the RRC inactive state. With the solution of the present disclosure, acknowledgement information report can be enabled to guarantee the reliability of positioning assistance data reception. It is benefit for the UE in the aspect of power saving, end-to-end positioning latency reduction and signaling overhead reduction.

14 Claims, 6 Drawing Sheets

(58) Field of Classification Search
CPC ... H04L 1/1854; H04L 1/1861; H04L 1/1864; H04L 1/1896; H04L 5/0055; H04L 5/0091; H04W 72/04; H04W 74/002; H04W 64/00; H04W 76/27
See application file for complete search history.

(56) References Cited

U.S. PATENT DOCUMENTS

| | | | | |
|---|---|---|---|---|
| 2020/0229130 | A1 | 7/2020 | Keating et al. | |
| 2020/0351026 | A1 | 11/2020 | Babaei et al. | |
| 2023/0189198 | A1 * | 6/2023 | Dong | H04W 68/005 455/456.1 |
| 2023/0319767 | A1 * | 10/2023 | Manolakos | H04W 64/00 455/456.1 |

FOREIGN PATENT DOCUMENTS

| | | | |
|---|---|---|---|
| CN | 110366112 | A | 10/2019 |
| CN | 111742508 | A | 10/2020 |
| WO | 2018/184571 | A1 | 10/2018 |
| WO | 2019/194409 | A1 | 10/2019 |
| WO | 2020/030258 | A1 | 2/2020 |
| WO | 2020/168573 | A1 | 8/2020 |
| WO | 2022/178837 | A1 | 9/2022 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.4.0, Mar. 2021, pp. 1-119.

"3rd Generation Partnership Project; Technical Specification Group Radio Access Network; NG-RAN; NR Positioning Protocol A (NRPPa) (Release 16)", 3GPP TS 38.455, V16.3.0, Apr. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; Study on New Radio Access Technology; Radio Interface Protocol Aspects (Release 14)", 3GPP TR 38.804, V14.0.0, Mar. 2017, pp. 1-57.

"3rd Generation Partnership Project; Technical Specification Group Radio Access Network; Study on NR Positioning Enhancements; (Release 17)", 3GPP TR 38.857, V17.0.0, Mar. 2021, 545 pages.

"Text proposal for IDLE and INACTIVE positioning", 3GPP TSG-RAN WG2 Meeting #113-e, R2-2102121, Agenda: 8.11.3.2, Huawei, Jan. 25-Feb. 5, 2021, pp. 1-4.

"Revised WID on NR Positioning Enhancements", 3GPP TSG RAN Meeting #91e, RP-210897, Agenda: 9.7.25, Intel Corporation, Mar. 16-26, 2022, 6 pages.

"Work Item on NR smalldata transmissions in INACTIVE state", 3GPP TSG RAN Meeting #86, RP-193252, Agenda Item: 9.1.2, ZTE Corporation, Dec. 9-12, 2019, 4 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"Discussion of NR positioning enhancements", 3GPP TSG RAN WG1 Meeting #102, R1-2005712, Agenda Item: 8.5.3, CATT, Aug. 17-28, 2020, pp. 1-21.

International Search Report and Written Opinion received for corresponding Patent Cooperation Treaty Application No. PCT/CN2021/107986, dated Mar. 29, 2022, 9 pages.

"Introduction of 5G V2X with NR Sidelink", 3GPP TSG-RAN WG2 Meeting #109-e, R2-2002264, LG Electronics Inc, Feb. 24-28, Mar. 2-6, 2020, 18 pages.

Office action received for corresponding Chinese Patent Application No. 202180010349.1, dated May 22, 2024, 8 pages of office action and 5 pages of translation available.

Office action received for corresponding Chinese Patent Application No. 202180010349.1, dated Oct. 31, 2024, 7 pages of office action and 5 pages of translation available.

Extended European Search Report received for corresponding European Patent Application No. 23177435.7, dated Mar. 7, 2024, 10 pages.

Office action received for corresponding European Patent Application No. 23177435.7, dated Nov. 6, 2025, 8 pages.

* cited by examiner

ACKNOWLEDGEMENT FEEDBACK FOR POSITIONING IN RADIO RESOURCE CONTROL INACTIVE STATE

RELATED APPLICATION

This application was originally filed as PCT Application No. PCT/CN2021/107986, filed on Jul. 22, 2021, which is incorporated herein by reference in its entirety.

FIELD

Embodiments of the present disclosure generally relate to the field of telecommunication and in particular to devices, methods, apparatuses and computer readable storage media of acknowledgement feedback for a positioning in Radio Resource Control (RRC) inactive state.

BACKGROUND

New Radio (NR) has introduced a new RRC state called "RRC inactive (RRC_INACTIVE)" to meet the requirement of 5G services. The inactive state intends to limit battery consumption for the UE similarly to the idle state, while at the same time the UE may reach the connected state with little signaling when to send data. In inactive state, the UE remains Evolved Packet System Connection Management (ECM)-connected from 5GC (5G core network) point of view and therefore the Next Generation (NG) connection between 5GC and cell is maintained.

Currently, small data transmission (SDT) has been agreed to be used as a manner to transmit a measurement report in RRC inactive state. Moreover, it has been agreed that some specific methods, measurements, signalling and procedures may support positioning for UEs in RRC inactive state for the topic of the positioning enhancements.

SUMMARY

In general, example embodiments of the present disclosure provide a solution of the acknowledgement feedback for a positioning in RRC inactive state.

In a first aspect, there is a method. The method comprises receiving, at a first device in a radio resource control, RRC, inactive state, information at least indicating a latency requirement for the first device to transmit an acknowledgement feedback for a reception of a message, the message being associated with a positioning of the first device and transmitted from a second device or a fourth device; and performing the transmission of the acknowledgement feedback for the reception of the message at least based on the information without changing the RRC inactive state.

In a second aspect, there is provided a method. The method comprises receiving, at a second device, information indicating a latency requirement for a first device to transmit an acknowledgement feedback for a reception of a message, the message being associated with a positioning of the first device and transmitted from a second device or a fourth device; and transmitting the information to the first device.

In a third aspect, there is provided a method. The method comprises generating, at a fourth device, information indicating a latency requirement for a first device to transmit an acknowledgement feedback for a reception of a message, the message being associated with a positioning of the first device and transmitted from a second device or a fourth device; and transmitting the information to the first device or the second device.

In a fourth aspect, there is provided a first device. The first device comprises at least one processor; and at least one memory including computer program codes; the at least one memory and the computer program codes are configured to, with the at least one processor, cause the first device at least to carry out the method according to the first aspect.

In a fifth aspect, there is provided a second device. The second device comprises at least one processor; and at least one memory including computer program codes; the at least one memory and the computer program codes are configured to, with the at least one processor, cause the second device at least to carry out the method according to the second aspect.

In a sixth aspect, there is provided a third device. The third device comprises at least one processor; and at least one memory including computer program codes; the at least one memory and the computer program codes are configured to, with the at least one processor, cause the third device at least to carry out the method according to the third aspect.

In a seventh aspect, there is provided an apparatus comprising means for receiving, at a first device in a radio resource control, RRC, inactive state, information at least indicating a latency requirement for the first device to transmit an acknowledgement feedback for a reception of a message, the message being associated with a positioning of the first device and transmitted from a second device or a fourth device; and means for performing the transmission of the acknowledgement feedback for the reception of the message at least based on the information without changing the RRC inactive state.

In an eighth aspect, there is provided an apparatus comprising means for receiving, at a second device, information indicating a latency requirement for a first device to transmit an acknowledgement feedback for a reception of a message, the message being associated with a positioning of the first device and transmitted from a second device or a fourth device; and means for transmitting the information to the first device.

In a ninth aspect, there is provided an apparatus comprising means for generating, at a fourth device, information indicating a latency requirement for a first device to transmit an acknowledgement feedback for a reception of a message, the message being associated with a positioning of the first device and transmitted from a second device or a fourth device; and means for transmitting the information to the first device or the second device.

In a tenth aspect, there is provided a computer readable medium having a computer program stored thereon which, when executed by at least one processor of a device, causes the device to carry out the method according to the first aspect.

In an eleventh aspect, there is provided a computer readable medium having a computer program stored thereon which, when executed by at least one processor of a device, causes the device to carry out the method according to the second aspect.

In a twelfth aspect, there is provided a computer readable medium having a computer program stored thereon which, when executed by at least one processor of a device, causes the device to carry out the method according to the third aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
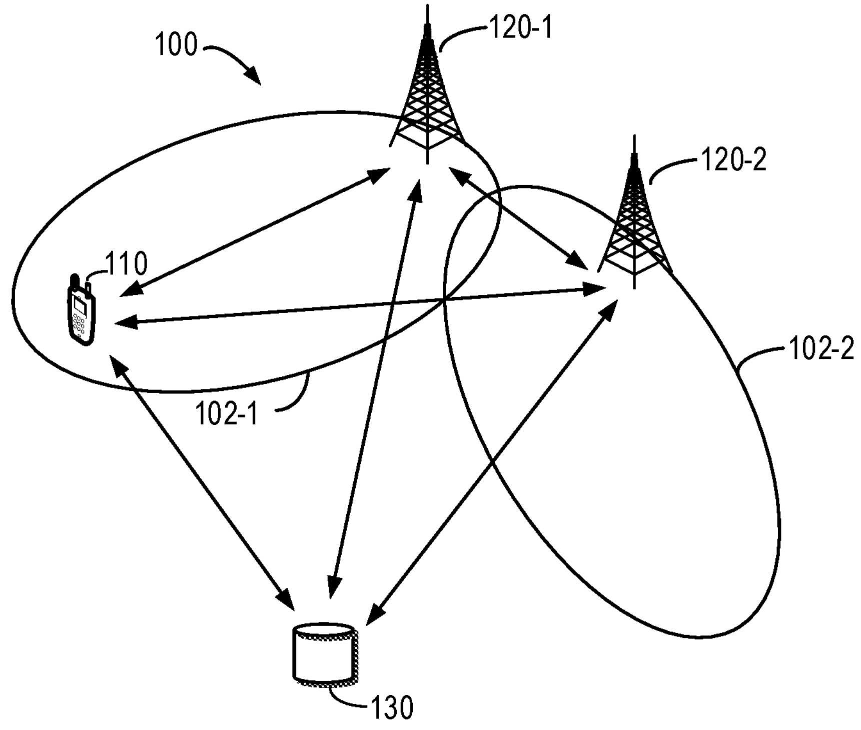
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120-1 (hereinafter may also be referred to as a gNB 120-1 or a second device 120-1). The network device 120-1 can manage a cell 102-1 (hereinafter may also be referred to as an anchor cell 102-1).

Furthermore, the communication network 100 may further comprise a network device 120-2 (hereinafter may also be referred to as a further gNB 120-2 or a third device 120-2). The network device 120-2 can manage a cell 102-2 (hereinafter may also be referred to as a last serving cell 102-2). Before transitioning into a RRC inactive mode, the UE 110 may serve by the last serving cell 102-2. With the movement of UE 110, the UE 110 may leave the coverage of the last serving cell 102-2 and enter the coverage of other cell, for example, the coverage of the anchor cell 102-1.

It is also possible that the last serving cell of the UE and the anchor cell are managed by a same gNB. In this case, the network device 120-1 and the network device 120-2 can be considered as a same network device. In some scenario, the network device 120-1 and the network device 120-2 may also be referred to as the network device 120 collectively.

The communication network 100 may also comprise a Location Management Function (LMF) 130 (hereinafter may also be referred to as a fourth device 130), which may communication with the terminal device 110 and network devices 120-1 and 120-2 The LMF 130 may be referred to as a management node in the core network.

It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, the RRC inactive state has been introduced for 5G service. A UE may be configured from connected state into inactive state by its last serving cell which may send to the UE an RRC suspend message including the applicable RAN notification area (RNA). The last serving cell becomes the anchor cell for the UE keeping the UE context when the UE is in inactive state.

In inactive state, the location of the UE can be monitored by the RNA. In the RNA area, the UE can move across cells substantially without requiring any signaling unless it has data to send. When the UE moves out of the RNA, the UE may inform the anchor cell with an RRC location update message. In this case, if the UE is located within a new cell, the new cell may typically trigger an Xn context fetch procedure to retrieve the UE context from the anchor cell. Then the anchor function is relocated, and the new cell becomes the new anchor cell.

For the the positioning enhancements, it has been agreed that some specific methods, measurements, signalling and procedures may support positioning for UEs in RRC inactive state. It has also been agreed that the SDT can be used as a manner to transmit a measurement report in RRC inactive state. Some different types of SDT can be supported, such as 4-step Radom Access Channel (RACH) based SDT, 2-step RACH based SDT and Configured Grant (CG) based SDT.

A Long-Term Evolution (LTE) Positioning Protocol (LPP) message may be transmitted from a transmitting device to a receiving device for the positioning procedure of the receiving device. The LPP message may include the IE ackRequested set to TRUE and a sequence number. When the receiving device can decode the ackRequested value and sequence number, the receiving device may return an acknowledgement for this LPP message. The acknowledgement may contain the IE ackIndicator set to the same sequence number as that in the received LPP message. When the transmitting device receives the acknowledgement for the transmitted LPP message and the acknowledgement can provide the ackIndicator IE matching the sequence number in the transmitted LPP message, the transmitting device may transmit a subsequent LPP message to the receiving device.

The positioning assistance data can be transmitted in a LPP message. For positioning operation in NR, the network device may need to deliver positioning assistance data to the positioning UE. The positioning assistance data involved in both Downlink (DL) and Uplink (UL) positioning may include the following aspects: Positioning Reference Signal (PRS) configuration, measurement and report configuration etc. for DL positioning procedure; UL PRS (For example, Sounding Reference Signal (SRS)) configuration initiated by the cell; capability and location information request initiated from the LMF; and Positioning SRS activation or deactivation signalling.

It has been proposed that the positioning assistance data can be transmitted in the RRC inactive state for UE power saving and positioning latency reduction. For example, the positioning assistance data can be transmitted in a new RACH procedure as downlink small data in RRC inactive state. the network device would page the device firstly and then the positioning device initiates a RRC connection resume procedure in RRC inactive state for downlink data transmission.

Some approaches are proposed that the positioning assistance data can be delivered is through paging message. For example, the UR can be waked up in RRC idle/inactive state to start positioning measurement and report through paging message, or the SRS for positioning configuration information can be carried in the paging message.

However, there is no such mechanism that allows the UE to feedback acknowledge of reception of positioning assistance data without entering connected mode. Therefore, how to enable the acknowledgement transmission after receiving the positioning assistance data may still need to be discussed.

The present disclosure proposes a solution of the acknowledgement feedback for a positioning in RRC inactive state. In this solution, the UE may receive information at least indicating a latency requirement for the UE to transmit an acknowledgement feedback for a reception of a LPP message in a RRC inactive state. The UE may perform the transmission of the acknowledgement feedback for the reception of the message at least based on the information without changing the RRC inactive state.

Principle and implementations of the present disclosure will be described in detail below with reference to FIGS. 2-3, which show schematic processes of the acknowledgement feedback for a positioning in RRC inactive state, respectively.

Figure 2:
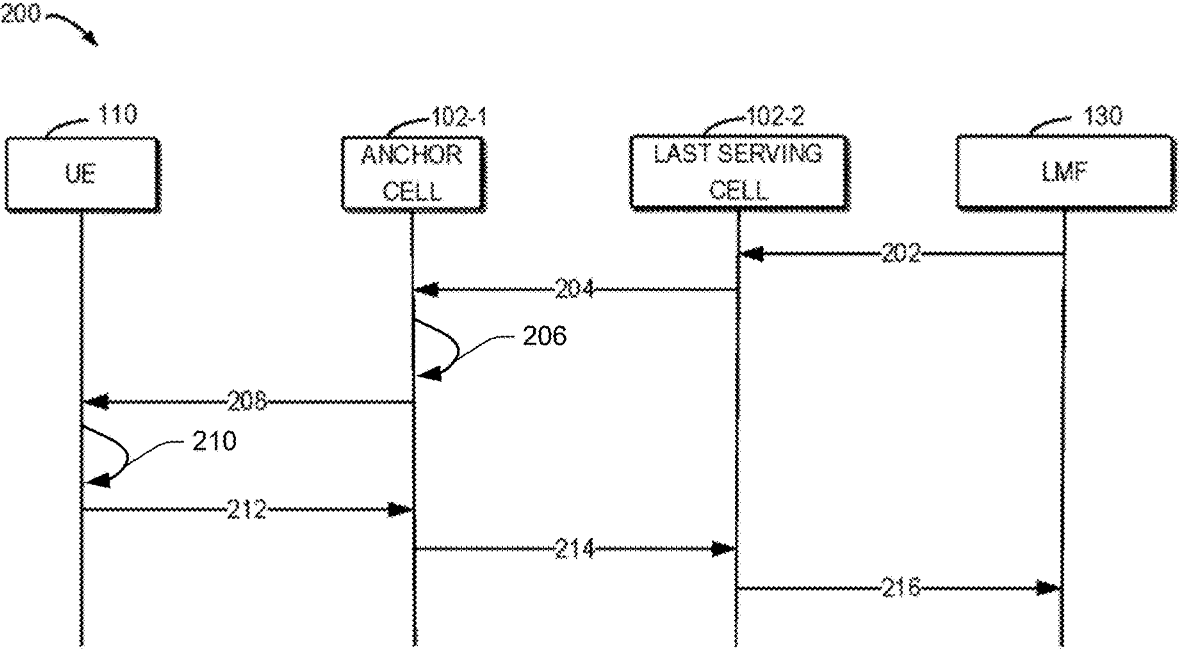
FIG. 2 shows a signaling chart illustrating a process of the acknowledgement feedback for a positioning in RRC inactive state according to some example embodiments of the present disclosure.

FIG. 2 shows a signaling chart illustrating a process 200 of the acknowledgement feedback for a positioning in RRC inactive state according to some example embodiments of the present disclosure. For the purpose of discussion, the process 200 will be described with reference to FIG. 1. The process 200 may involve the UE 110, the anchor cell 102-1, the last serving cell 102-2 and the LMF 130 as illustrated in FIG. 1. The anchor cell 102-1 can be managed by the gNB 120-1 as shown in FIG. 1, and the last serving cell can be managed by the gNB 120-1 or the gNB 120-2 as shown in FIG. 1.

For latency-strict cases, the LMF 130 may provide the respective QoS information, which may indicate the tolerable latency on the UE response. As shown in FIG. 2, the LMF 130 may transmit 202, to a last serving cell 102-2, information indicating a latency requirement for the UE 110 to transmit an acknowledgement feedback for a reception of a LPP message. Hereinafter the information indicating the latency requirement of the UE 110 may also be referred to as latency information.

In some example embodiments, the latency information can be provided, for example, along with the positioning assistance data since the LMF 130 may delivery the positioning assistance data to the last serving cell 102-2.

Then the last serving cell 102-2 may transmit 204 latency information to an anchor cell 102-1. In some example embodiments, the anchor cell 102-1 can obtain the latency information from the last serving cell 102-2 by paging information. In a paging triggered positioning assistance data transmission, the last serving cell 102-2 may indicate the cells in the RNA to paging the UE 110 for the purpose of positioning assistance data transmission. Thus, the latency information may also be delivered along with paging triggering signalling to the cells in the RNA.

It is also possible that the anchor cell 102-1 may request the latency information from the last serving cell 102-2. Upon receiving the RRC resume request from the UE 110, the anchor cell 102-1 may request positioning assistance data from the last serving cell 102-2. Then, the last serving cell 102-2 may provide the positioning assistance data to the anchor cell 102-1. Therefore, the latency information may also be provided along with the positioning assistance data delivery message from last serving cell 102-2.

After receiving the latency information from the last serving cell 102-2, the anchor cell 102-1 may determine the transmission resources and the transmission mode for the UE to transmit the acknowledgement feedback for the reception of the LPP message, i.e., an acknowledgment message.

In some example embodiments, the anchor cell 102-1 may determine that the UE 110 may transmit the reception acknowledgement to the anchor cell 102-1 through the CG resource in RRC inactive or idle state, for example, through CG resource for SDT.

In some example embodiments, the anchor cell 102-1 may also determine that the UE 110 may transmit the reception acknowledgement to the anchor cell 102-1 through RACH resources.

As another option, the anchor cell 102-1 may also determine that the UE 110 may transmit the reception acknowledgement to the anchor cell 102-1 through Physical Uplink Control Channel (PUCCH) resource configured through system information.

The anchor cell 102-1 may use the latency information to determine if any of the above-mentioned transmission mode and corresponding resources are suitable for acknowledgment message transmission based on QoS and the time where it sends the positioning assistance data, since the anchor cell 102-1 knows when the pre-configured CG or PUCCH or RACH resource are going to happen. If any of the configured resource are not suitable, the anchor cell 102-1 may configure one new dedicated resource for the acknowledgment message transmission.

Thus, it is also possible that the anchor cell 102-1 may also determine that the UE 110 may transmit the reception acknowledgement to the anchor cell 102-1 through a dedicated resource.

Once the transmission mode is determined, the corresponding transmission resources may also be determined. Based on the determined transmission mode and resources, the anchor cell 102-1 may indicated the UE 110 how to send the acknowledgment information.

Then the anchor cell 102-1 may generate 206 feedback assisted information for the UE 110 to transmit the UL acknowledgement message based on the latency information received from the last serving cell 102-2 and the determined transmission mode and corresponding transmission resources.

In some example embodiments, the acknowledgement feedback assisted information may include a time window for the UE 110 to transmit the UL acknowledgement message. For example, the time window may refer to a response time before which the UE 110 must feedback the acknowledgment. Alternatively, the time window may refer to the transmission window within which the UE 110 is allowed to try multiple times for acknowledgment transmission.

In some example embodiments, the acknowledgement feedback assisted information may also include the transmission mode and corresponding transmission resources for the UL acknowledgement transmission of the UE 110. For example, the transmission mode may be CG-SDT, RACH-based SDT and PUCCH, etc.

Correspondingly, the transmission resources can be the CG resources, the RACH resources or the PUCCH resources.

Then the anchor cell 102-1 may transmit 208 the acknowledgement feedback assisted information to the UE 110. For example, the acknowledgement feedback assisted information can be transmitted from the anchor cell 102-1 to the UE 110, for example, along with the DL positioning assistance data delivery message, which may be included in DL MAC PDU along with the RRC release message.

Specifically, as one option, the acknowledgement feedback assisted information can be transmitted, for example, along with DL positioning assistance data delivery message, through a RACH message, such as MessageB (MsgB) for 2-step RACH procedure or Message4 (Msg4) for 4-step RACH procedure.

As another option, the acknowledgement feedback assisted information can be transmitted, for example, along with DL positioning assistance data delivery message, through DL Physical Downlink Shared Channel (PDSCH) in response to receiving the RRC resume request through CG resource configured for SDT.

After receiving the acknowledgement feedback assisted information, the UE 110 may perform 210 the UL acknowledgement transmission based on the acknowledgement feedback assisted information.

In some example embodiments, if the UE 110 determines that the transmission resources are indicated in the acknowledgement feedback assisted information, the UE 110 can use the configured transmission resources (i.e., 2-step/4-step RACH resource or CG-SDT resources, PUCCH resource or the dedicate resource) to transmit the acknowledgement message.

For example, if the cell indicated the 2-step RACH-based SDT for acknowledgement transmission, the UE 110 can transmit the acknowledgement transmission along with the with the RRC resume request in MessageA (MsgA) for 2-step RACH procedure.

Furthermore, the UE 110 may obtain a time window associated with the UL acknowledgement transmission from the acknowledgement feedback assisted information, which may refer to a response time before which the UE 110 must feedback the acknowledgment or a transmission window within which the UE 110 is allowed to try multiple times for acknowledgment transmission.

If the UE 110 determines that the UL acknowledgement transmission can be performed on the transmission resources indicated in the acknowledgement feedback assisted information before the expiry of the time window, the UE 110 may transmit 212 the UL acknowledgement transmission to the anchor cell 102-1.

In some example embodiments, the UE 110 may transmit the UL acknowledgement transmission along with the RRC resume request in MsgA for 2-step RACH procedure, Message3 (Msg3) for 4-step RACH procedure or CG PUSCH resource for SDT.

In some example embodiments, the UE 110 may also indicate in the RRC message, such as RRCResumeRequest, that UE 110 requests to transmits a NAS message (e.g., a LPP message). This indication may also indicate that the UE 110 does not request to enter a RRC connected mode for the provision of NAS message. Alternatively, this indication may also indicate that request to a RRC enter connected mode due to the transmission of the NAS message.

In some example embodiments, the UE can be configured to enter a RRC connected mode if the message size exceeds certain message size threshold value. The threshold value can be set so that UE can provide the LPP acknowledgement message using the pre-configured feedback resources.

If the UE 110 determines that the UL acknowledgement transmission fails to be performed on the transmission resources indicated in the acknowledgement feedback assisted information before the expiry of the time window, the UE 110 may transmit a LPP error message to the anchor cell 102-1, which may include the received transaction ID and type of error.

For example, the error cause may be e.g., indicated as undefined, or a new erroCause may defined that indicates that latency threshold was exceeded.

In some example embodiments, the UE 110 may transmit the LPP error message to the anchor cell 102-1 by entering the RRC connected mode.

In this case, when the acknowledgement message is not successfully transmitted, the UE 110 may discard the LPP message.

It is also possible that the transmission resources for the UL acknowledgement transmission fails to be indicated in the acknowledgement feedback assisted information. In this case, the UE 110 may autonomously select the pre-configured resources (i.e., 2-step/4-step RACH resource or CG-SDT resources or PUCCH) for SDT. As another option, the UE 110 may select the default transmission mode (i.e., RACH-based SDT). In this scenario, the UE 110 may indicate a signalling to the anchor cell to indicate this is the acknowledgement message for the positioning assistance data.

After receiving the acknowledgement message from the UE 110, the anchor cell 102-1 may forward 214 the acknowledgement message to the last serving cell 102-2. The last serving cell 102-2 may further forward 216 the acknowledgment message to LMF 130.

With the solution shown in the process 200 of FIG. 2, the LMF can indicate the latency information for the anchor gNB (managing the anchor cell) to determine the transmission mode and the transmission resources for acknowledgment message transmission. The anchor gNB may indicate the transmission resources and transmission mode to the UE along with the LPP message (i.e., positioning assistance data) delivery. Thus, this solution can dynamically allocate the resource for acknowledgment message transmission for fast acknowledgment message transmission. Furthermore, the anchor gNB may also be pre-configured with the transmission resource in advance for the acknowledgment message when the LPP message is delivered to UE.

As another option, the LMF 130 may also indicate the latency information to the UE 110. The UE may indicate the latency information to the serving cell for UL resource configuration, if the UE has been configured to provide acknowledgment message in latency critical manner. The solution can be described with reference to FIG. 3.

Figure 3:
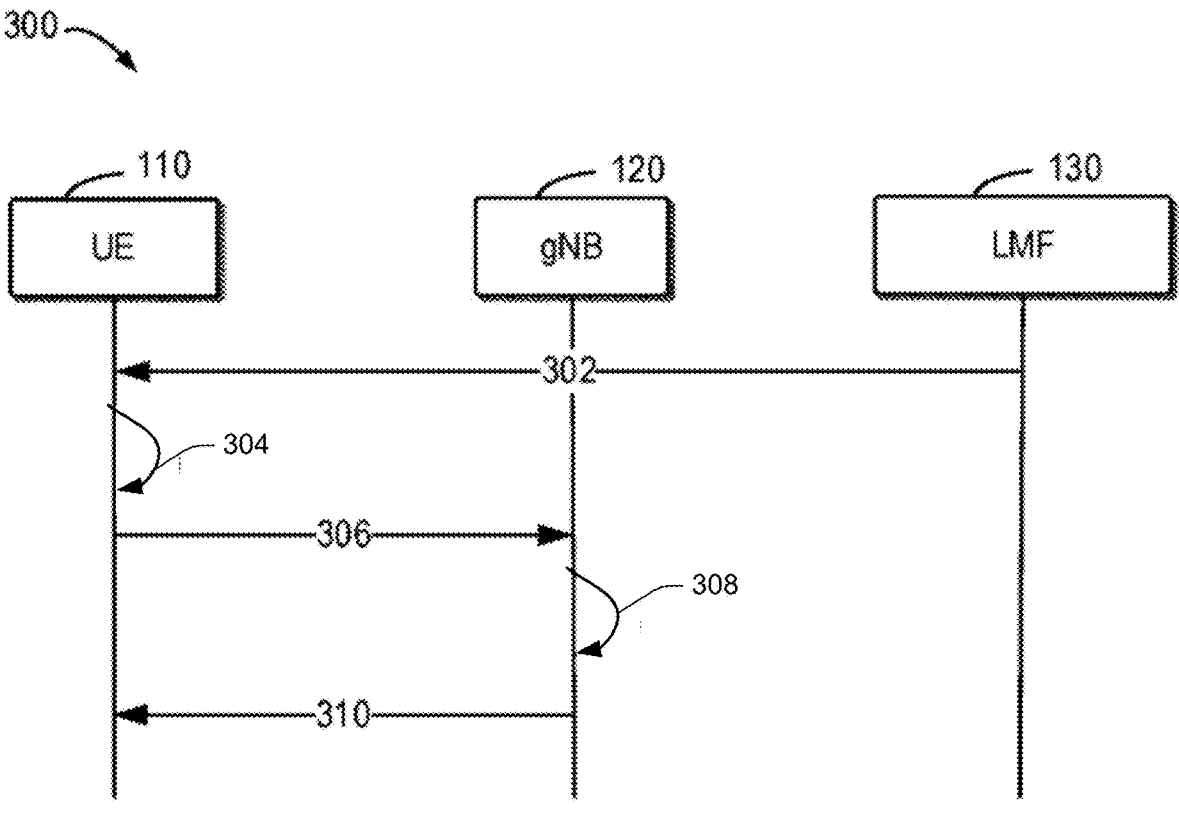
FIG. 3 shows a signaling chart illustrating a process of the acknowledgement feedback for a positioning in RRC inactive state according to some example embodiments of the present disclosure.

Now the reference is made to FIG. 3. FIG. 3 shows a signaling chart illustrating a process 300 of the acknowledgement feedback for a positioning in RRC inactive state according to some example embodiments of the present disclosure. For the purpose of discussion, the process 300 will be described with reference to FIG. 1. The process 300 may involve the UE 110, the gNB 120 and the LMF 130 as illustrated in FIG. 1.

As shown in FIG. 3, the LMF 130 may transmit 302 the latency information to UE 110. For example, the LMF 130 may transmit the latency information to the UE 110 by LPP message. For example, the latency information may be added as one new element information in the LPP message header to indicate whether the acknowledgement request is latency critical. Alternatively, the latency information may be added as one new element information ackRequestedLatencyCritical indicated in the LPP message. It is to be understood that the element information can also be referred to as another parameter name with similar functionality.

In some example embodiments, if the latency information is included in the LPP message, the LPP message can be represented as below.

TABLE 1

LPP message

```
-- ASN1START
LPP-Message ::= SEQUENCE {
   transactionID            LPP-TransactionID    OPTIONAL,-- Need ON
   endTransaction           BOOLEAN,
   sequenceNumber           SequenceNumber       OPTIONAL,-- Need ON
   acknowledgement          Acknowledgement      OPTIONAL,-- Need ON
   lpp-MessageBody          LPP-MessageBody      OPTIONAL -- Need ON
}
SequenceNumber ::= INTEGER (0..255)
Acknowledgement ::= SEQUENCE {
   ackRequested     BOOLEAN,
   ackIndicator SequenceNumber        OPTIONAL
ackRequestedLatencyCritical BOOLEAN
```

After receiving the LPP message, the UE 110 can know whether the acknowledgement request is latency critical or not and may determine 304 how and where to transmit the LPP acknowledgement message. When UE is triggered to provide latency critical feedback, the UE may transmit the LPP acknowledgement message separately. That is, the UE 110 may not provide the LPP acknowledgement message as part of any other LPP message that it may have in the transmission buffer.

In some example embodiments, if the UE determines that the current available UL resources can satisfy the latency requirement, the UE 110 may transmit the acknowledgement message on the current available UL resources. For example, the gNB 120 may pre-configure some RACH-SDT/CG-SDT resource for the UE 110 to transmit the LPP acknowledgement message.

In some example embodiments, if the UE determines that the current available UL resources fails to satisfy the latency requirement, the UE 110 may indicate the latency information to the gNB 120 for new UL resource allocation. For example, the UE 110 may transmit 306 the latency information to the gNB 120 to request the new UL resource allocation.

In some example embodiments, the transmission of the latency information may be cell specific or RNA specific. When the UE re-selects to a new cell or a new RNA, the UE 110 may provide the latency restriction/latency information to the re-selected cell.

Based on the latency information, the gNB 120 may determine 308 the new UL resources to be allocated to the UE 110 for the acknowledgement message transmission. The gNB 120 may transmit 310 an indication of the allocated UL resources to the UE 110. It is to be understood that any other message relating to positioning to be transmitted from the gNB 120 to the UE 110 may also be followed by the UL resource configuration.

With the solution of the present disclosure, acknowledgement information report can be enabled to guarantee the reliability of positioning assistance data reception. No RRC connection state transition from inactive state to connected state for acknowledgement information feedback after receiving the positioning assistance data. Furthermore, the latency information can be utilized to configure the SDT resource for acknowledgement information report to guarantee QoS requirement. It is benefit for the UE in the aspect of power saving, end-to-end positioning latency reduction and signaling overhead reduction.

Figure 4:
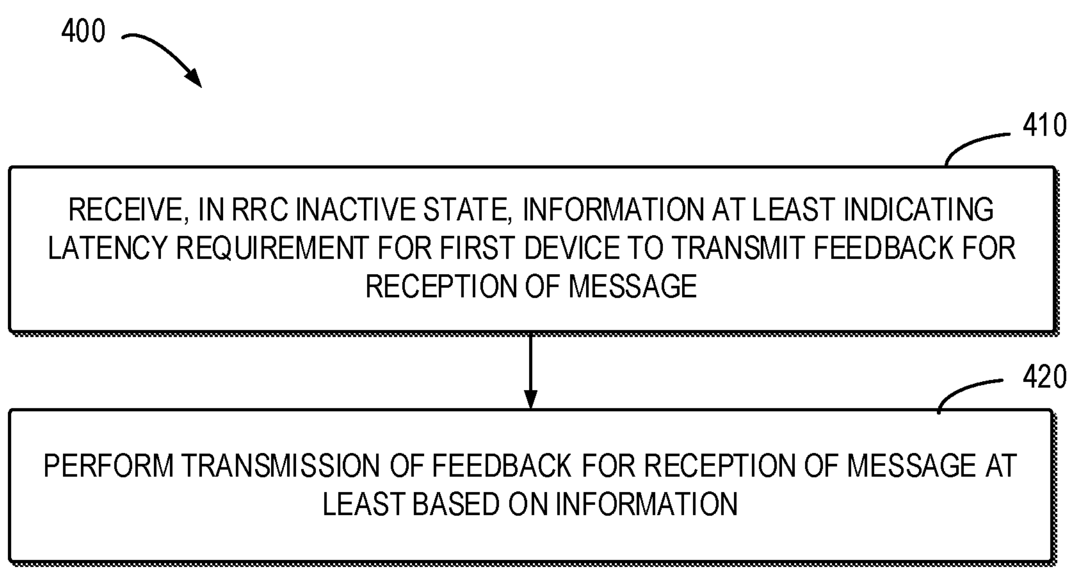
FIG. 4 shows a flowchart of an example method of the acknowledgement feedback for a positioning in RRC inactive state according to some example embodiments of the present disclosure.

FIG. 4 shows a flowchart of an example method 400 of the acknowledgement feedback for a positioning in RRC inactive state according to some example embodiments of the present disclosure. The method 400 can be implemented at the first device 110 as shown in FIG. 1. For the purpose of discussion, the method 400 will be described with reference to FIG. 1.

At 410, the first device receives in a RRC inactive state, information at least indicating a latency requirement for the first device to transmit an acknowledgement feedback for a reception of a message. The message is associated with a positioning of the first device and transmitted from a second device or a fourth device.

In some example embodiments, the first device may receive the information through a message B in a 2-step random access process between the first device and the second device; a message 4 in a 4-step random access process between the first device and the second device, or a data channel associated with a configure grant for a small data transmission between the first device and the second device.

At 420, the first device performs the transmission of the acknowledgement feedback for the reception of the message at least based on the information without changing the RRC inactive state.

In some example embodiments, if the the information is received from the second device, the first device may determine, based on the latency requirement, a time window; determine a transmission mode and resources for transmitting the acknowledgement feedback for the reception of the message; determine whether the acknowledgement feedback is allowed to be transmitted on the resources with the transmission mode before the time window expires. If the first device determines that the acknowledgement feedback is allowed to be transmitted on the resources with the transmission mode before the time window expires, the first device may transmit the acknowledgement feedback to the second device on the resources with the transmission mode.

In some example embodiments, the resources comprising at least one of resources associated with a random access process between the first device and the second device, resources associated with a configured grant allocated for the first device, resources associated with a control channel between the first device and the second device, or resources dedicate for the first device to transmit the acknowledgement feedback.

In some example embodiments, the transmission mode comprises at least one of a configured grant based small data transmission, a random access process based small data transmission, or a transmission carried by a control channel between the first device and the second device.

In some example embodiments, the time window indicating one of a response time before which the first device is required to transmit the acknowledgment; or a transmission window within which the first device is allowed to perform multiple attempts for the transmission of the acknowledgment feedback.

In some example embodiments, if the first device determines that the acknowledgement feedback fails to be allowed to be transmitted on the resources with the transmission mode before the time window expires, the first device may transmit an indication of an error of the reception to the second device.

In some example embodiments, the indication of the error comprises a type of the error.

In some example embodiments, the indication is transmitted in a RRC connected mode.

In some example embodiments, if the information is received from the second device and if the first device determines that resources for transmitting the acknowledgement feedback for the reception of the message fail to be indicated in the information, the first device may select the resources from a set of candidate resources pre-configured for the transmission.

In some example embodiments, the first device may transmit, to the second device, an indication that first device does not request to enter a RRC connected mode for transmitting the acknowledgement feedback.

In some example embodiments, if the information is received from a fourth device, the first device may determine whether a set of candidate resources available for the transmission satisfy the latency requirement. If the first device determines that the set of candidate resources available for the first device to transmit the acknowledgement feedback fails to satisfy the latency requirement, the first device may transmit a request of resources for the first device to transmit the acknowledgement feedback to the second device. If the first device determines that the resources for the first device to transmit the acknowledgement feedback has been allocated by the second device, the first device may transmit the acknowledgement feedback on the allocated resources.

In some example embodiments, if the first device determines that the set of candidate resources available for the first device to transmit the acknowledgement feedback satisfy the latency requirement, the first device may select resources for the first device to transmit the acknowledgement feedback from the set of candidate resources and transmit the acknowledgement feedback on the selected resources.

In some example embodiments, the latency requirement comprises at least one of an expected time of the acknowledgement feedback, or a latency threshold for provision of the acknowledgement feedback.

In some example embodiments, the first device comprises a terminal device and the second device comprises a network device and the fourth device comprises a location management entity.

Figure 5:
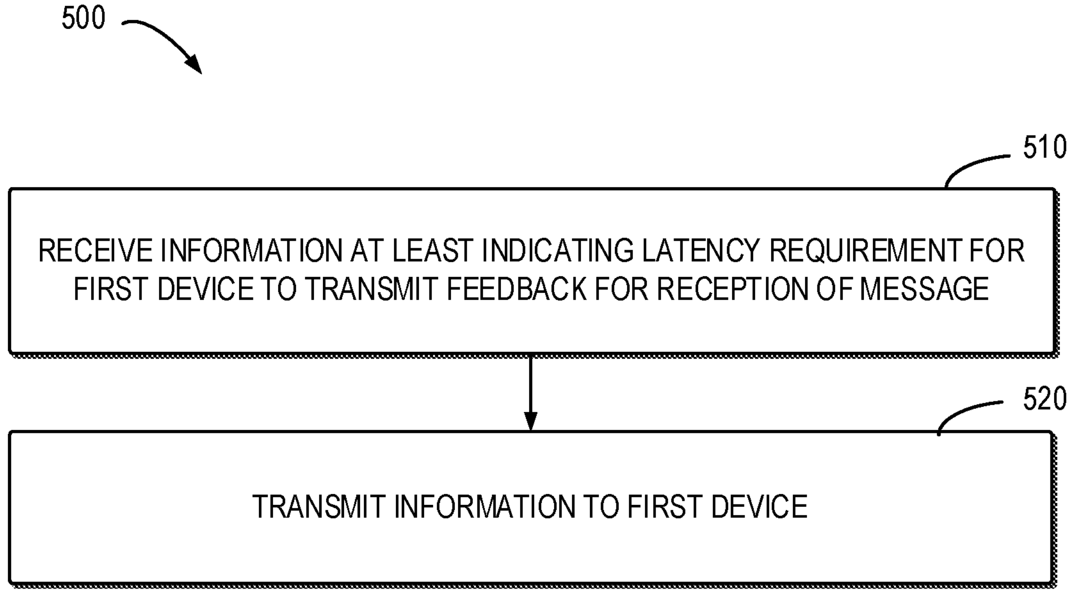
FIG. 5 shows a flowchart of an example method of the acknowledgement feedback for a positioning in RRC inactive state according to some example embodiments of the present disclosure.

FIG. 5 shows a flowchart of an example method 500 of the acknowledgement feedback for a positioning in RRC inactive state according to some example embodiments of the present disclosure. The method 500 can be implemented at the second device 120 as shown in FIG. 1. For the purpose of discussion, the method 500 will be described with reference to FIG. 1.

At 510, the second device receives information at least indicating a latency requirement for a first device to transmit an acknowledgement feedback for a reception of a message. The message is associated with a positioning of the first device and transmitted from a second device or a fourth device.

In some example embodiments, the second device may receive the information from the third device via a paging signalling.

In some example embodiments, the second device may transmit a request for the information to a third device; and receive the information from the third device.

In some example embodiments, the second device may transmit, to the first device, the information along with the message.

In some example embodiments, the second device may determine, based on the information, resources and transmission mode for the first device to transmit the acknowledgement feedback; generate an indication of resources and transmission mode for the first device to transmit the acknowledgement feedback; and transmit, to the first device, the indication included in the information.

In some example embodiments, the resources comprising at least one of resources associated with a random access process between the first device and the second device, resources associated with a configured grant allocated for the first device, resources associated with a control channel between the first device and the second device, or resources dedicate for the first device to transmit the acknowledgement feedback.

In some example embodiments, the transmission mode comprises at least one of a configured grant based small data transmission, a random access process based small data transmission, or a transmission carried by a control channel between the first device and the second device.

At 520, the second device transmits the information to the first device.

In some example embodiments, the second device may transmit the information through at least one of a message B in a 2-step random access process between the first device and the second device, a message 4 in a 4-step random access process between the first device and the second device, or a data channel associated with a configure grant for a small data transmission between the first device and the second device.

In some example embodiments, the second device may receive, from the first device, an indication that the first device does not enter a RRC connected mode for transmitting the acknowledgement feedback.

In some example embodiments, the second device may receive, from the first device, a request of resources for the first device to transmit the acknowledgement feedback; and allocate the resource for the first device to transmit the acknowledgement feedback.

In some example embodiments, the latency requirement comprises at least one of an expected time of the acknowledgement feedback, or a latency threshold for provision of the acknowledgement feedback.

In some example embodiments, the first device comprises a terminal device and the second device comprises a network device and the fourth device comprises a location management entity.

Figure 6:
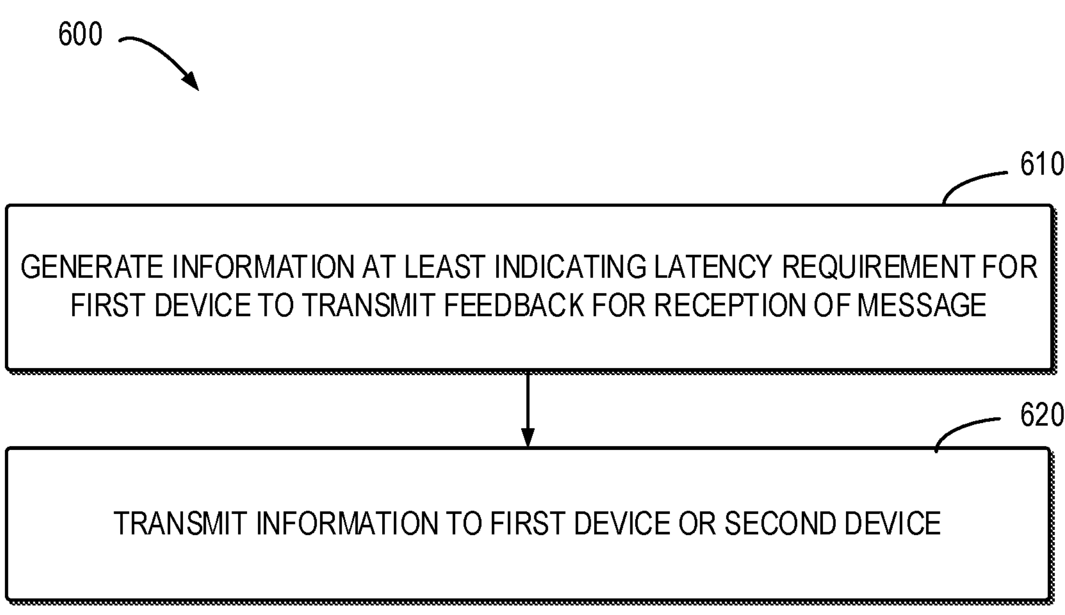
FIG. 6 shows a flowchart of an example method of the acknowledgement feedback for a positioning in RRC inactive state according to some example embodiments of the present disclosure.

FIG. 6 shows a flowchart of an example method 600 of the acknowledgement feedback for a positioning in RRC inactive state according to some example embodiments of the present disclosure. The method 600 can be implemented at the fourth device 130 as shown in FIG. 1. For the purpose of discussion, the method 600 will be described with reference to FIG. 1.

At 610, the fourth device generates information indicating a latency requirement for a first device to transmit an acknowledgement feedback for a reception of a message. The message is associated with a positioning of the first device and transmitted from a second device or a fourth device.

At 620, the fourth device transmits the information to the first device or the second device via a third device.

In some example embodiments, the fourth device may transmit the information along with the message.

In some example embodiments, the latency requirement comprises at least one of an expected time of the acknowledgement feedback, or a latency threshold for provision of the acknowledgement feedback.

In some example embodiments, the first device comprises a terminal device and the second device comprises a network device and the fourth device comprises a location management entity.

In some example embodiments, an apparatus capable of performing the method 400 (for example, implemented at the UE 110) may comprise means for performing the respective steps of the method 400. The means may be implemented in any suitable form. For example, the means may be implemented in a circuitry or software module.

In some example embodiments, the apparatus comprises means for receiving, at a first device in a radio resource control, RRC, inactive state, information at least indicating a latency requirement for the first device to transmit an acknowledgement feedback for a reception of a message, the message being associated with a positioning of the first device and transmitted from a second device or a fourth device; and means for performing the transmission of the acknowledgement feedback for the reception of the message at least based on the information without changing the RRC inactive state.

In some example embodiments, an apparatus capable of performing the method 500 (for example, implemented at the gNB 120) may comprise means for performing the respective steps of the method 500. The means may be implemented in any suitable form. For example, the means may be implemented in a circuitry or software module.

In some example embodiments, the apparatus comprises means for receiving, at a second device, information indicating a latency requirement for a first device to transmit an acknowledgement feedback for a reception of a message, the message being associated with a positioning of the first device and transmitted from a second device or a fourth device; and means for transmitting the information to the first device.

In some example embodiments, an apparatus capable of performing the method 600 (for example, implemented at the LMF 130) may comprise means for performing the respective steps of the method 600. The means may be implemented in any suitable form. For example, the means may be implemented in a circuitry or software module.

In some example embodiments, the apparatus comprises means for generating, at a fourth device, information indicating a latency requirement for a first device to transmit an acknowledgement feedback for a reception of a message, the message being associated with a positioning of the first device and transmitted from a second device or a fourth device; and means for transmitting the information to the first device or the second device.

Figure 7:
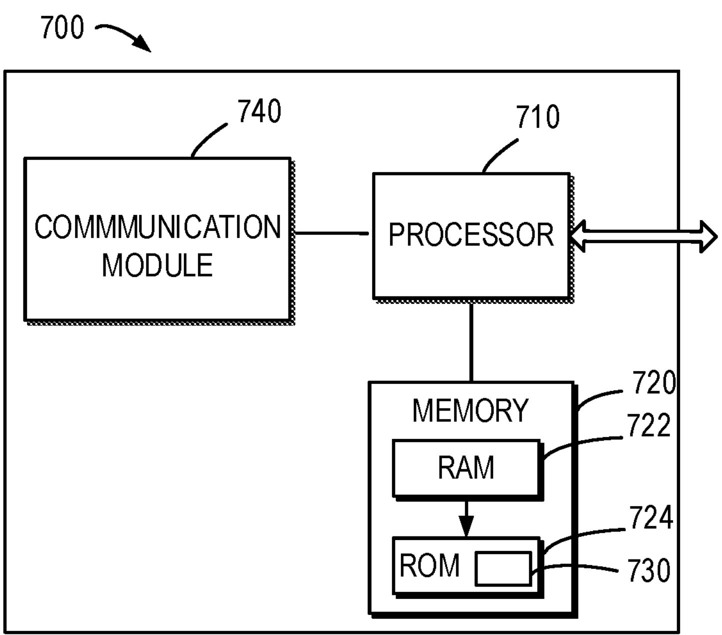
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the UE 110, the gNB 120 and the LMF 130 as shown in FIG. 1. As shown, the device 700 includes one or more processors 710, one or more memories 740 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
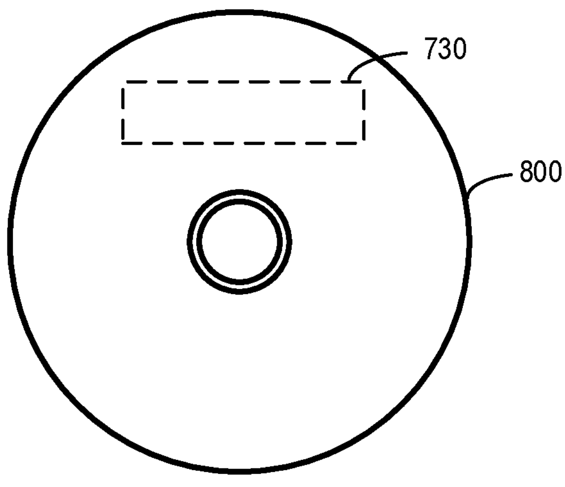
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-600 as described above with reference to FIGS. 4-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory storing instructions that, when executed by the at least one processor, cause the first device at least to perform:
receiving information at least indicating a latency requirement for the first device to transmit an acknowledgement feedback for a reception of a message, the message being associated with a positioning of the first device and transmitted from a second device or a fourth device, wherein the first device is in a radio resource control (RRC) inactive state; and
performing the transmission of the acknowledgement feedback for the reception of the message at least based on the information without changing the RRC inactive state,
wherein the information is received from the second device, and wherein performing the transmission of the acknowledgement feedback comprises:
determining, based on the latency requirement, a time window associated with the transmission of the acknowledgement feedback;
obtaining, from the information, an indication of a transmission mode and resources for transmitting the acknowledgement feedback for the reception of the message;
determining whether the acknowledgement feedback is allowed to be transmitted on the resources with the transmission mode before the time window expires; and
in accordance with a determination that the acknowledgement feedback is allowed to be transmitted on the resources with the transmission mode before the time window expires, transmitting the acknowledgement feedback to the second device on the resources with the transmission mode,
wherein the resources comprising at least one of the following:
resources associated with a random access process between the first device and the second device,
resources associated with a configured grant allocated for the first device,
resources associated with a control channel between the first device and the second device, or
resources dedicate for the first device to transmit the acknowledgement feedback.

2. The first device of claim 1, wherein receiving the information comprises:
receiving the information from the second device through at least one of:
a message B in a 2-step random access process between the first device and the second device,
a message 4 in a 4-step random access process between the first device and the second device, or
a data channel associated with a configure grant for a small data transmission between the first device and the second device.

3. The first device of claim 1, wherein the transmission mode comprises at least one of the following:
a configured grant based small data transmission,
a random access process based small data transmission, or
a transmission carried by a control channel between the first device and the second device.

4. The first device of claim 1, wherein the time window indicating one of the following:
a response time before which the first device is required to transmit the acknowledgment; or
a transmission window within which the first device is allowed to perform multiple attempts for the transmission of the acknowledgment feedback.

5. The first device of claim 1, the first device is further caused to perform:
in accordance with a determination that the acknowledgement feedback fails to be allowed to be transmitted on the resources with the transmission mode before the time window expires, transmitting an indication of an error of the reception to the second device.

6. The first device of claim 1, wherein the information is received from the second device, and wherein performing the transmission of the acknowledgement feedback comprises:
in accordance with a determination that resources for transmitting the acknowledgement feedback for the reception of the message fail to be indicated in the information, selecting the resources from a set of candidate resources pre-configured for the transmission.

7. The first device of claim 1, the first device is further caused to perform:
transmitting, to the second device, an indication that first device does not request to enter a RRC connected mode for transmitting the acknowledgement feedback.

8. The first device of claim 1, wherein the information is received from a fourth device, and wherein performing the transmission of the acknowledgement feedback comprises:
determining whether a set of candidate resources available for the transmission satisfy the latency requirement;
in accordance with a determination that the set of candidate resources available for the first device to transmit the acknowledgement feedback fails to satisfy the latency requirement, transmitting a request of resources for the first device to transmit the acknowledgement feedback to the second device; and
in accordance with a determination that the resources for the first device to transmit the acknowledgement feedback has been allocated by the second device, transmitting the acknowledgement feedback on the allocated resources.

9. The first device of claim 1, wherein the latency requirement comprises at least one of the following:
an expected time of the acknowledgement feedback, or
a latency threshold for provision of the acknowledgement feedback.

10. The first device of claim 1, wherein the first device comprises a terminal device, the second device comprises a network device and the fourth device comprises a location management entity.

11. A first device comprising:

at least one processor; and at least one memory storing instructions that, when executed by the at least one processor, cause the first device at least to perform:

receiving information at least indicating a latency requirement for the first device to transmit an acknowledgement feedback for a reception of a message, the message being associated with a positioning of the first device and transmitted from a second device or a fourth device, wherein the first device is in a radio resource control (RRC) inactive state; and performing the transmission of the acknowledgement feedback for the reception of the message at least based on the information without changing the RRC inactive state, wherein the information is received from the second device, and wherein performing the transmission of the acknowledgement feedback comprises:

determining, based on the latency requirement, a time window associated with the transmission of the acknowledgement feedback;

obtaining, from the information, an indication of a transmission mode and resources for transmitting the acknowledgement feedback for the reception of the message;

determining whether the acknowledgement feedback is allowed to be transmitted on the resources with the transmission mode before the time window expires; and in accordance with a determination that the acknowledgement feedback is allowed to be transmitted on the resources with the transmission mode before the time window expires, transmitting the acknowledgement feedback to the second device on the resources with the transmission mode, wherein the transmission mode comprises at least one of the following:

a configured grant based small data transmission, a random access process based small data transmission, or a transmission carried by a control channel between the first device and the second device.

12. The first device of claim 11, wherein the first device comprises a terminal device, the second device comprises a network device and the fourth device comprises a location management entity.

13. A first device comprising:

at least one processor; and at least one memory storing instructions that, when executed by the at least one processor, cause the first device at least to perform:

receiving information at least indicating a latency requirement for the first device to transmit an acknowledgement feedback for a reception of a message, the message being associated with a positioning of the first device and transmitted from a second device or a fourth device, wherein the first device is in a radio resource control (RRC) inactive state; and performing the transmission of the acknowledgement feedback for the reception of the message at least based on the information without changing the RRC inactive state, wherein the information is received from the second device, and wherein performing the transmission of the acknowledgement feedback comprises:

determining, based on the latency requirement, a time window associated with the transmission of the acknowledgement feedback;

obtaining, from the information, an indication of a transmission mode and resources for transmitting the acknowledgement feedback for the reception of the message;

determining whether the acknowledgement feedback is allowed to be transmitted on the resources with the transmission mode before the time window expires; and in accordance with a determination that the acknowledgement feedback is allowed to be transmitted on the resources with the transmission mode before the time window expires, transmitting the acknowledgement feedback to the second device on the resources with the transmission mode, wherein the time window indicating one of the following:

a response time before which the first device is required to transmit the acknowledgment; or a transmission window within which the first device is allowed to perform multiple attempts for the transmission of the acknowledgment feedback.

14. The first device of claim 13, wherein the first device comprises a terminal device, the second device comprises a network device and the fourth device comprises a location management entity.

* * * * *